(12) United States Patent
Yamamoto

(10) Patent No.: US 9,894,283 B2
(45) Date of Patent: Feb. 13, 2018

(54) IMAGE PROCESSING APPARATUS AND METHOD THEREFOR

(71) Applicant: CANON KABUSHIKI KAISHA, Tokyo (JP)

(72) Inventor: Ai Yamamoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 122 days.

(21) Appl. No.: 14/624,496

(22) Filed: Feb. 17, 2015

(65) Prior Publication Data

US 2015/0256806 A1    Sep. 10, 2015

(30) Foreign Application Priority Data

Mar. 7, 2014    (JP) .................................. 2014-045561

(51) Int. Cl.

| | | |
|---|---|---|
| *G06K 9/00* | (2006.01) | |
| *H04N 5/235* | (2006.01) | |
| *H04N 9/73* | (2006.01) | |
| *H04N 9/67* | (2006.01) | |
| *H04N 5/225* | (2006.01) | |

(52) U.S. Cl.
CPC ......... *H04N 5/2351* (2013.01); *H04N 5/2258* (2013.01); *H04N 9/67* (2013.01); *H04N 9/735* (2013.01)

(58) Field of Classification Search
USPC ...... 382/162, 260, 276, 321; 1/1; 348/231.6, 348/231.99, 241, 342, E5.078
See application file for complete search history.

(56) References Cited

U.S. PATENT DOCUMENTS

| | | | |
|---|---|---|---|
| 6,538,242 B1 | 3/2003 | Kuno et al. ................ 250/208.1 |
| 7,672,017 B2 | 3/2010 | Komiya et al. ................ 358/1.9 |
| 7,680,393 B2 | 3/2010 | Shinkai et al. ................ 386/52 |
| 7,733,381 B2 | 6/2010 | Shinkai et al. ............ 348/223.1 |
| 8,063,976 B2 * | 11/2011 | Kita ...................... G02B 5/284 |
| | | | 348/231.6 |
| 9,210,418 B2 * | 12/2015 | Dai ....................... G01J 3/2823 |
| 2001/0041007 A1 * | 11/2001 | Aoki ....................... G06K 9/46 |
| | | | 382/190 |

FOREIGN PATENT DOCUMENTS

| | | |
|---|---|---|
| JP | H11-85952 | 3/1999 |
| JP | 2001-008224 | 1/2001 |
| JP | 2001-136543 | 5/2001 |
| JP | 2004-180279 | 6/2004 |
| JP | 2006-060732 | 3/2006 |
| JP | 2009-100304 | 5/2009 |
| JP | 2009-141904 | 6/2009 |
| JP | 2010-246036 | 10/2010 |
| JP | 2011-211317 | 10/2011 |

OTHER PUBLICATIONS

SMPTE Standard, Academy Color Encoding Specification (ACES), Mar. 12, 2012, pp. 1 to 23, SMPTE ST 2065-1:2012.

* cited by examiner

*Primary Examiner* — Anh Do
(74) *Attorney, Agent, or Firm* — Fitzpatrick, Cella, Harper & Scinto

(57) ABSTRACT

Image data, and spectral imaging data of shooting scene of the image data are inputted. Information relating to a light source of the shooting scene is generated based on the spectral imaging data. The information relating to the light source is appended to the image data.

18 Claims, 15 Drawing Sheets

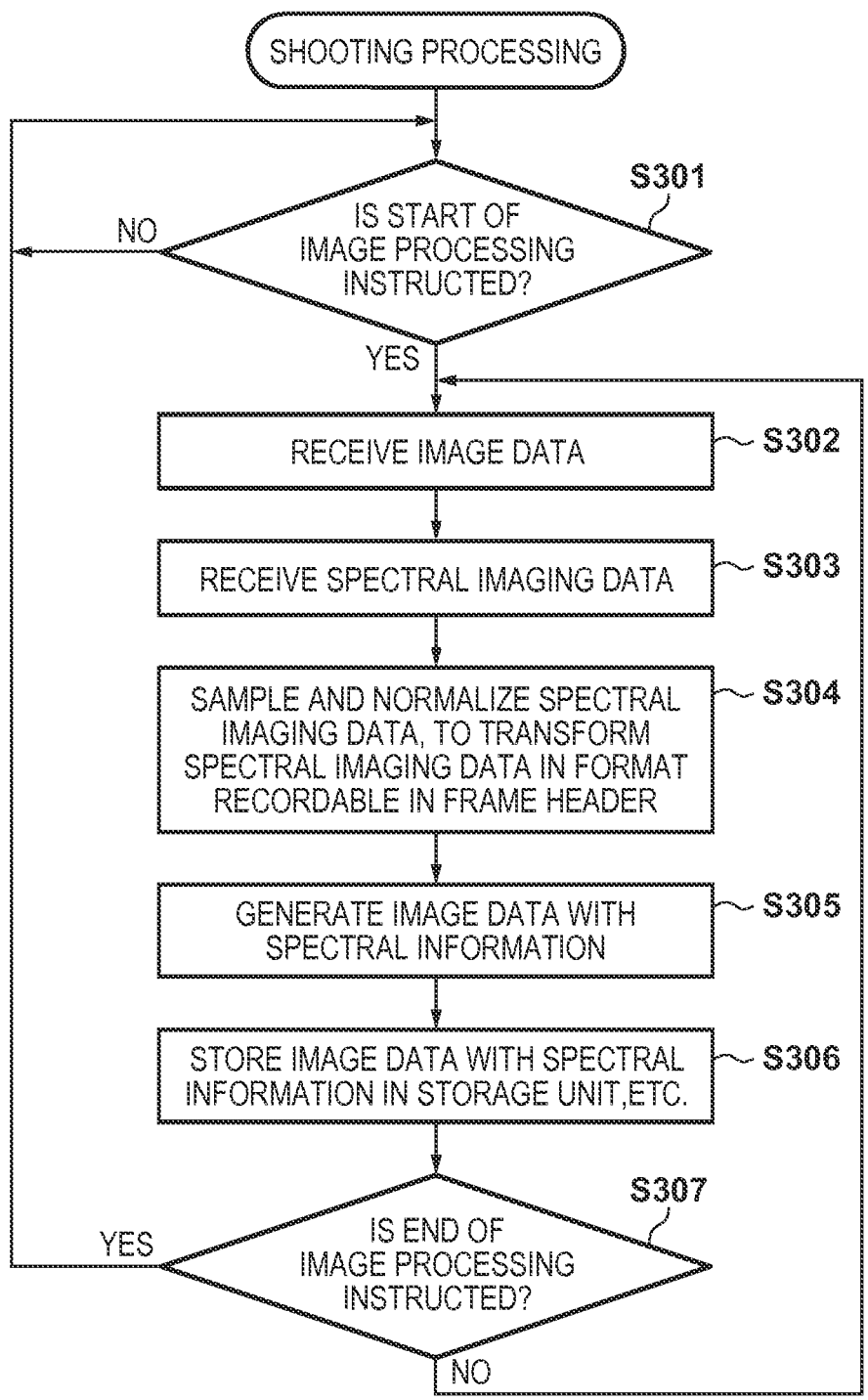

F I G. 6A
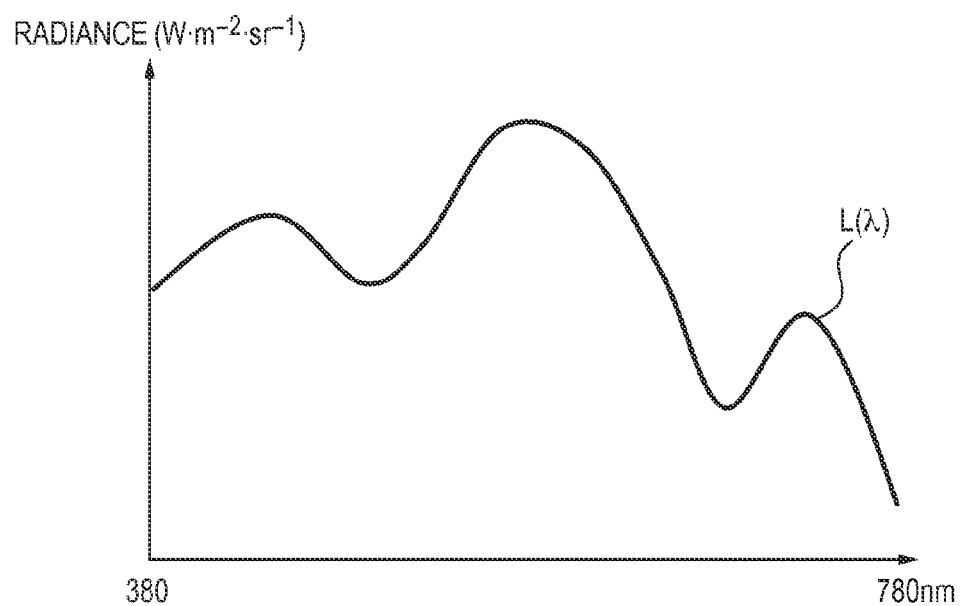
F I G. 6B
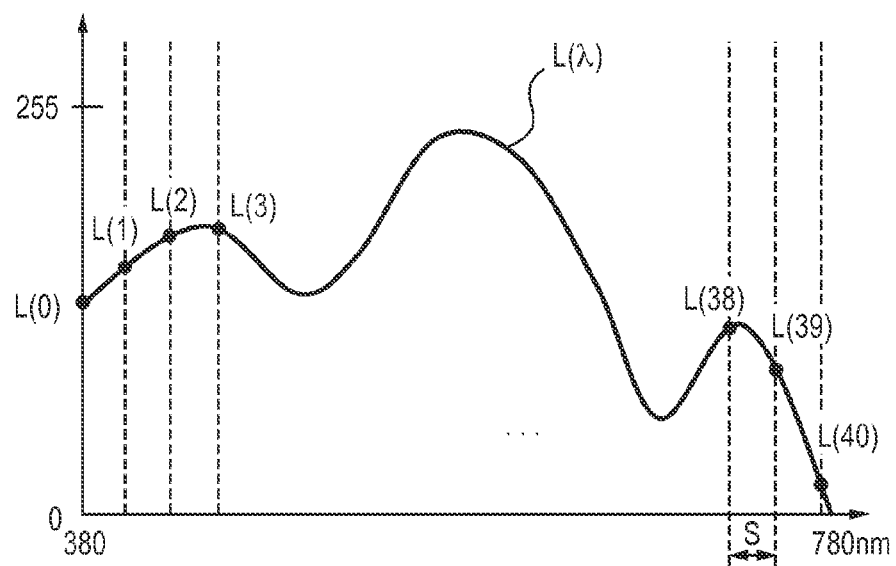

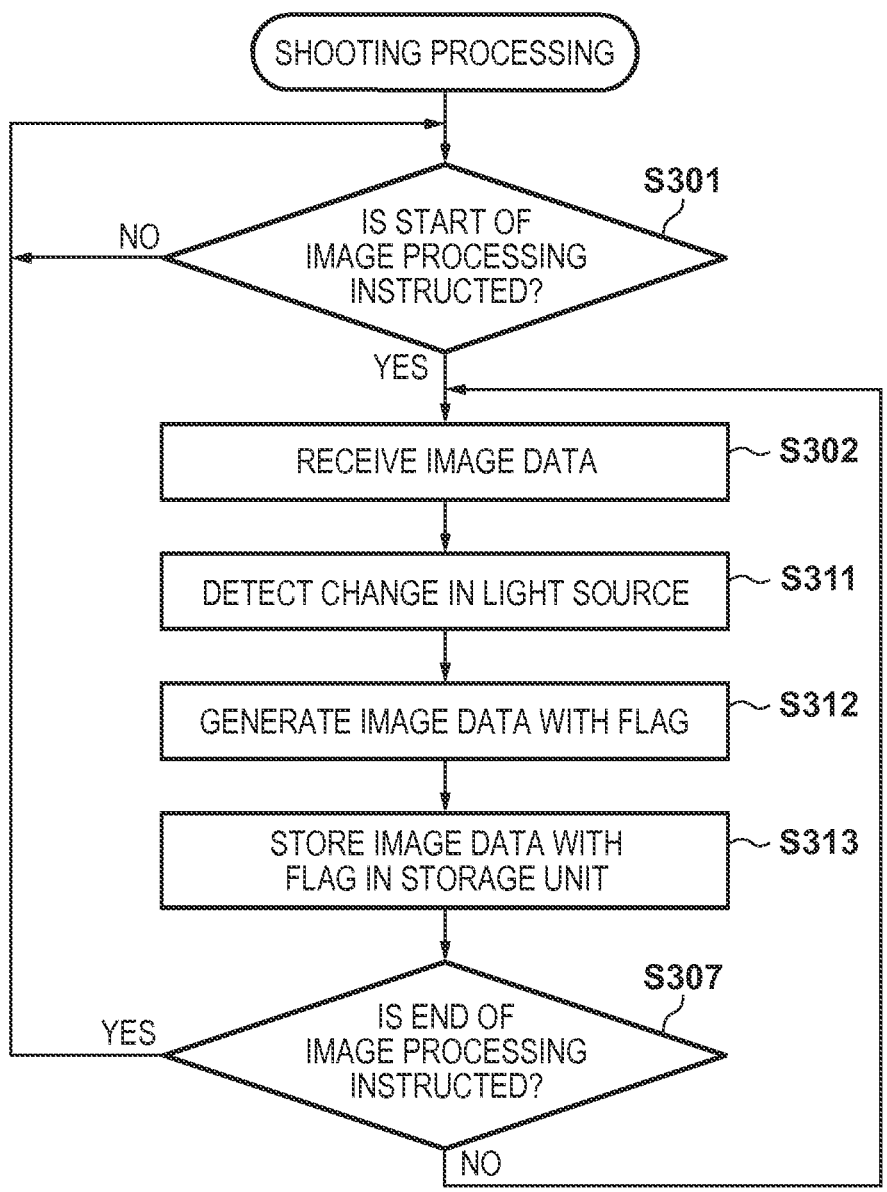

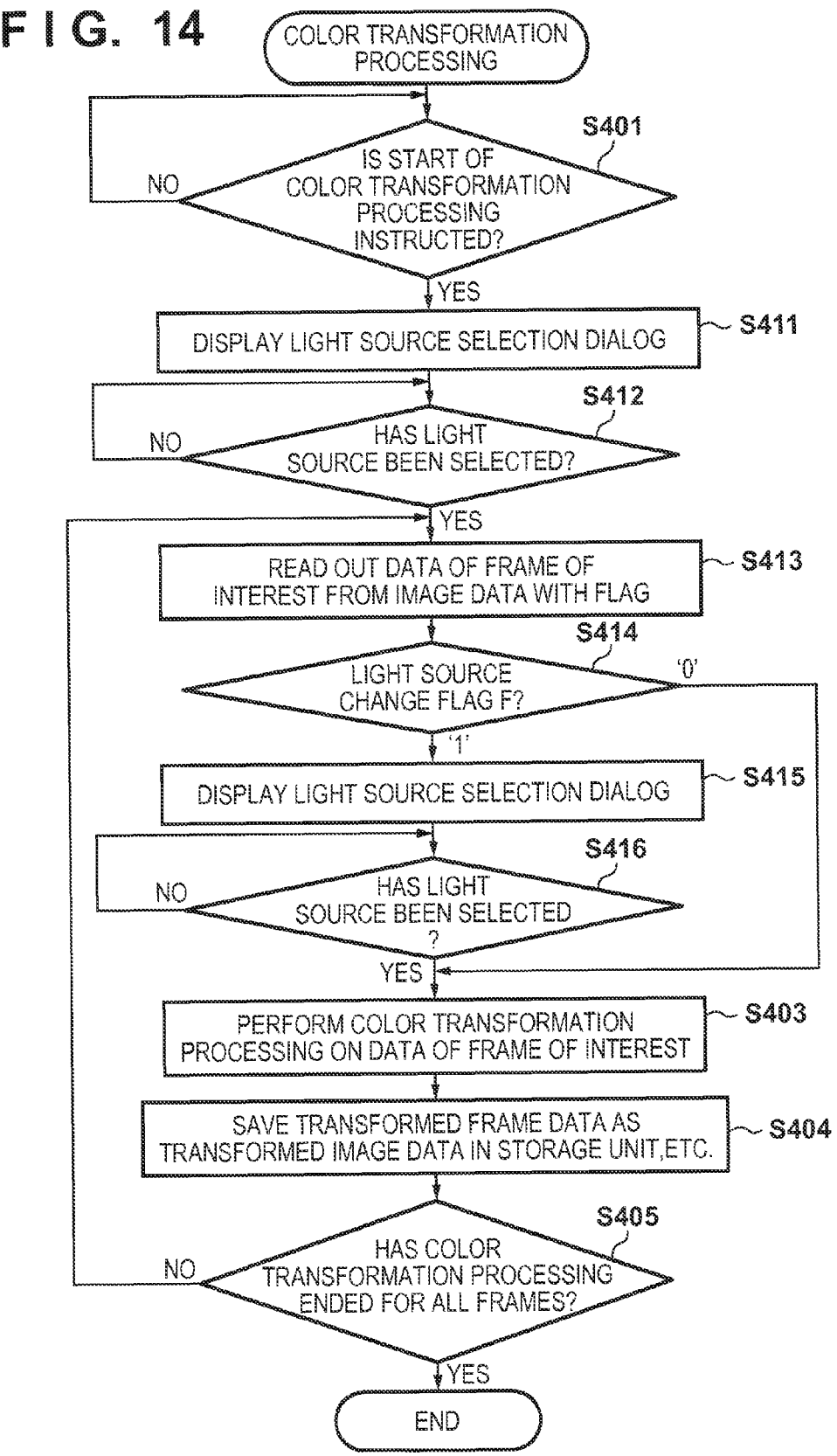

IMAGE PROCESSING APPARATUS AND METHOD THEREFOR

BACKGROUND OF THE INVENTION

Field of the Invention

The present invention relates to color transformation processing of shooting data.

Description of the Related Art

The Academy of Motion Picture Arts and Sciences (AMPAS) is working to standardization of color adjustment in video production.

FIG. 1 is a block diagram showing the color transformation architecture of the digital movie production workflow standard AMPAS-IIF proposed by the AMPAS. The color transformation architecture of AMPAS-IIF is basically defined as association between two common color spaces and input and output devices.

The two common color spaces are an input color space 1503 and an output color space 1505. The input color space 1503 is ACES (Academy Color Encoding Specification), and the output color space 1505 is OCES (Output Color Encoding Specification). Transformation from an input device color space to the ACES color space is performed by input device transform (IDT) 1502. Transformation from the ACES color space to the OCES color space is performed by a reference rendering transform (RRT) 1504. Transformation from the OCES color space to an output device color space is performed by output device transform (ODT) 1506.

With the IDT 1502, video data of an imaging apparatus 1501 serving as an input device (data in a device color space) is transformed to video data in the ACES 1503 (data in a common color space). The video data in the ACES 1503 undergoes editing processing such as color adjustment. After that, the video data having undergone the editing processing is transformed to video data in the OCES 1505 by the RRT 1504. The video data in the OCES 1505 (data in the common color space) is then transformed to video data of a display device 1507 serving as an output device (data in a device color space) by the ODT 1506.

The ACES 1503 is defined as a color space with reference to a scene, and has values obtained by linearly transforming CIE (Commission Internationale de l'Éclairage) tristimulus values X, Y, and Z obtained by measuring the scene itself by a colorimeter. Furthermore, the chromaticities of the three RGB primary colors to cover the entire spectrum locus are determined, and encoded in 16 bits (16-bit float).

AMPAS-IIF provides the video production workflow with a standard. There are provided a mechanism of transforming various moving image materials to the ACES as a common color space, a mechanism of transforming a viewing moving image for a movie or television (TV) from the ACES to an ideal output device color space (OCES), and a mechanism of performing color transformation from the OCES to an existing display device. As a result, it is expected to improve the efficiency of complicated image transformation and color adjustment processing in an editing process after shooting.

Matrix coefficients to be used for the IDT 1502 are determined according to sensor characteristics and spectral characteristics of a light source in a shooting scene. Conventionally, the manufacturer of an imaging apparatus incorporates matrix coefficients for input device transform based on several representative types of light sources, for example, sunlight and a halogen lamp in input device transform processing or editing software in the apparatus, thereby providing them to the user.

In the IDT 1502 as well, a light source corresponding to the light source in the shooting scene is selected from the several types of light sources incorporated in advance by the manufacturer, and applied to input device transform. On the other hand, various light sources are used as expression methods for shooting of a moving image product such as a movie or commercial. As a result, there may exist a light source which cannot be processed by only the light sources incorporated in advance by the manufacturer, the matrix coefficients of the IDT 1502 may not coincide with those of the light source in the actual shooting scene, thereby disabling accurate transformation of video data of the imaging apparatus 1501 to the ACES 1503.

In addition, the light source may change in a series of scenes. For example, there is a series of scenes in which a subject moves from inside to outside. In the IDT 1502, however, it is common practice to use a method of applying one set of matrix coefficients to one video data. Consequently, for example, even if the transformation accuracy of video data to the ACES 1503 is high in an indoor scene, the transformation accuracy may decrease in an outdoor scene.

The above problem indicates that the color of the video data changes into unexpected color by transforming the video data to the ACES 1503. In this case, in a post-process, a complicated work is required. For example, an editor who does not know the actual color of the subject has to perform color adjustment, thereby lowering the working efficiency.

SUMMARY OF THE INVENTION

In one aspect, an image processing apparatus comprising: a first input unit configured to input image data; a second input unit configured to input spectral imaging data of shooting scene of the image data; a generation unit configured to generate information relating to a light source of the shooting scene based on the spectral imaging data; and an appending unit configured to append the information relating to the light source to the image data.

According to the aspect, it is possible to append information relating to a light source in a shooting scene to image data.

Further features of the present invention will become apparent from the following description of exemplary embodiments with reference to the attached drawings.

BRIEF DESCRIPTION OF THE DRAWINGS

FIG. 5 is a flowchart for explaining shooting processing.

FIGS. 6A and 6B are graphs for explaining sampling and normalization of spectral imaging data by a sampling unit.

FIG. 13 is a flowchart for explaining shooting processing.

FIG. 14 is a flowchart for explaining color transformation processing.

DESCRIPTION OF THE EMBODIMENTS

Image processing according to an embodiment of the present invention will be described in detail below with reference to the accompanying drawings.

In the embodiment, processing of preventing color deviation caused by a mismatch between a light source assumed by color transformation and a light source in an actual shooting scene when collecting information relating to the light source in the shooting scene and performing color transformation (to be referred to as "ACES transformation" hereinafter) of video data or image data to the ACES color space will be described. In other words, the spectral characteristics of a light source (especially, a light source for illuminating a subject) in a scene are acquired while shooting the scene, thereby performing accurate ACES transformation of video data or image data based on the spectral characteristic data. In the following, the image data will be described as including the video data.

First Embodiment

[Arrangement of Apparatus]

Figure 1:
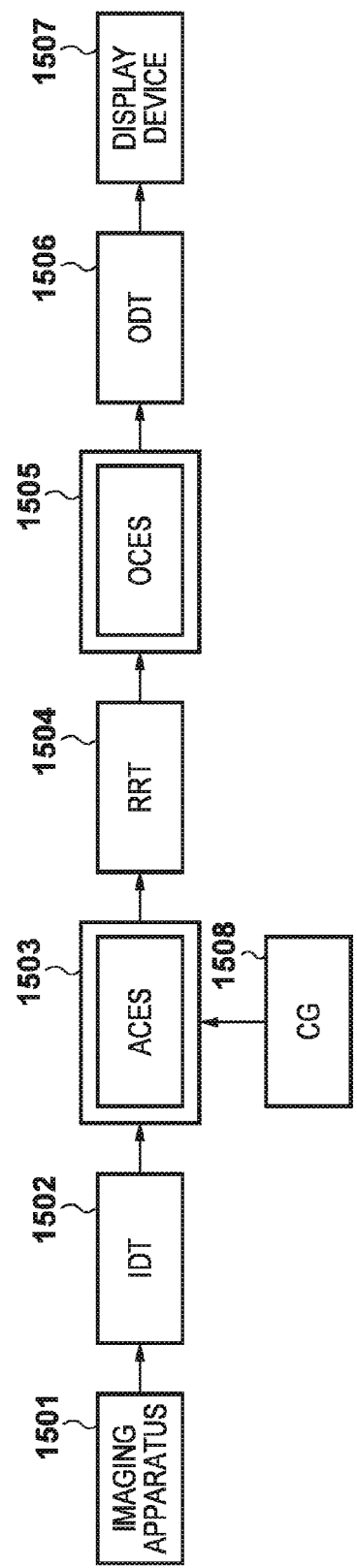
FIG. 1 is as block diagram showing the color transformation architecture of the digital movie production workflow standard AMPAS-IIF proposed by the AMPAS.
Figure 2:
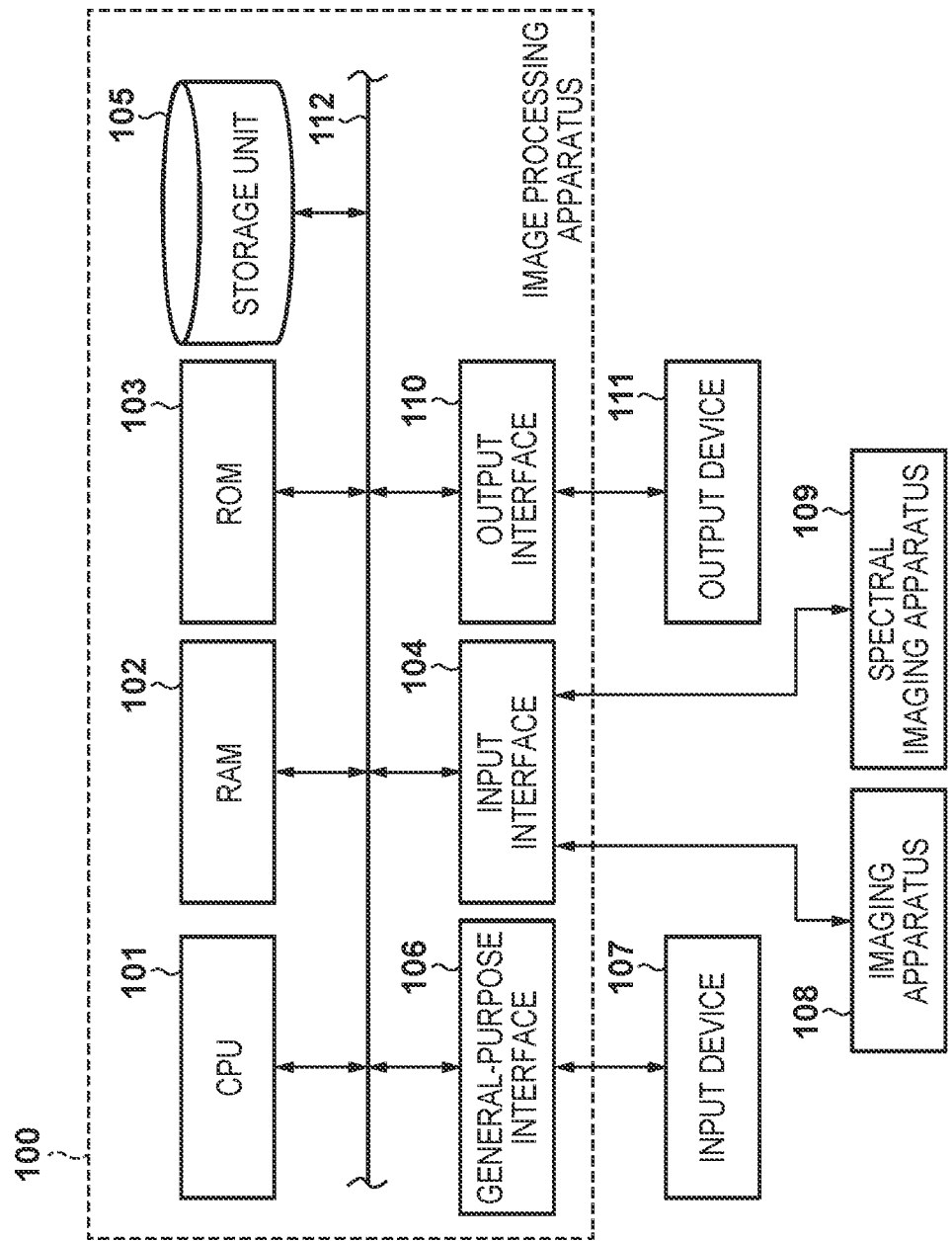
FIG. 2 is a block diagram showing the arrangement of an image processing apparatus according to an embodiment.

FIG. 2 is a block diagram showing the arrangement of an image processing apparatus 100 according to the embodiment.

A microprocessor (CPU) 101 executes various programs stored in a read only memory (ROM) 103, a storage unit 105, and the like using a random access memory (RAM) 102 as a work memory, thereby controlling components (to be described later) through a system bus 112. The programs executed by the CPU 101 include a program for implementing image processing (to be described later). Note that the storage unit 105 is implemented by a hard disk drive (HDD) or a solid-state drive (SSD).

An input interface (I/F) 104 is an interface such as SDI (Serial Digital Interface) for video input. The input I/F 104 is connected to an imaging apparatus 108 which generates image data by shooting a scene, a spectral imaging apparatus 109 which generates spectral imaging data by performing spectral imaging for a light source in the scene and ambient light, and the like. Note that a memory card and a card reader connected to a general-purpose I/F 106 may be used to input image data and spectral imaging data. An interface such as USB (Universal Serial Bus) 2.0/3.0, IEEE1394b-2002, HDMI® (High-Definition Multimedia Interface) 1.4, DisplayPort™, or Thunderbolt™ can be used as the input I/F 104.

The general-purpose interface (I/F) 106 is, for example, a serial bus interface such as USB to which a keyboard, a pointing device, a card reader, or the like is connected as an input device 107. An output I/F 110 is, for example, a multimedia interface such as HDMI® or DisplayPort™ to which a monitor or the like is connected as an output device 111.

The CPU 101 displays a user interface (UI) on the output device 111, and executes various programs including the image processing program of the embodiment in accordance with a user instruction input through the UI. When executing the image processing program of the embodiment, the CPU 101 inputs image data and spectral imaging data from the imaging apparatus 108 and the spectral imaging apparatus 109 based on the user instruction. Based on the various data and spectral imaging data stored in the storage unit 105, the CPU 101 performs various kinds of calculation processes for the image data, and stores the processed image data in the storage unit 105 or stores it in a memory card through the general-purpose I/F 106. At this time, the CPU 101 displays the input image data and the processed image data on the UI. Note that the CPU 101 may temporarily store the image data and spectral imaging data input from the imaging apparatus 108 and the spectral imaging apparatus 109 in the storage unit 105, and then execute the calculation processes.

The storage destination of the image processing program of the embodiment and the data necessary for the image processing is not limited to the storage unit 105, and may be a recording medium such as a memory card, or a computer apparatus (server) connected through a network interface and network (neither of which is shown).

[Image Processing]

The image processing of the embodiment includes processing (to be referred to as "shooting processing" hereinafter) associated with a scene shooting process, and processing (to be referred to as "color transformation processing" hereinafter) associated with a subsequent color transformation process. These processes are executed in parallel or sequentially. For example, when it is desirable to obtain image data in the ACES while shooting a scene, color transformation processing is executed simultaneously with shooting. Also, there may be a case in which shot image data is temporarily saved as data in a device color space, and then the image data undergoes ACES transformation. In this case, after shooting processing, color transformation processing is executed.

Figure 3:
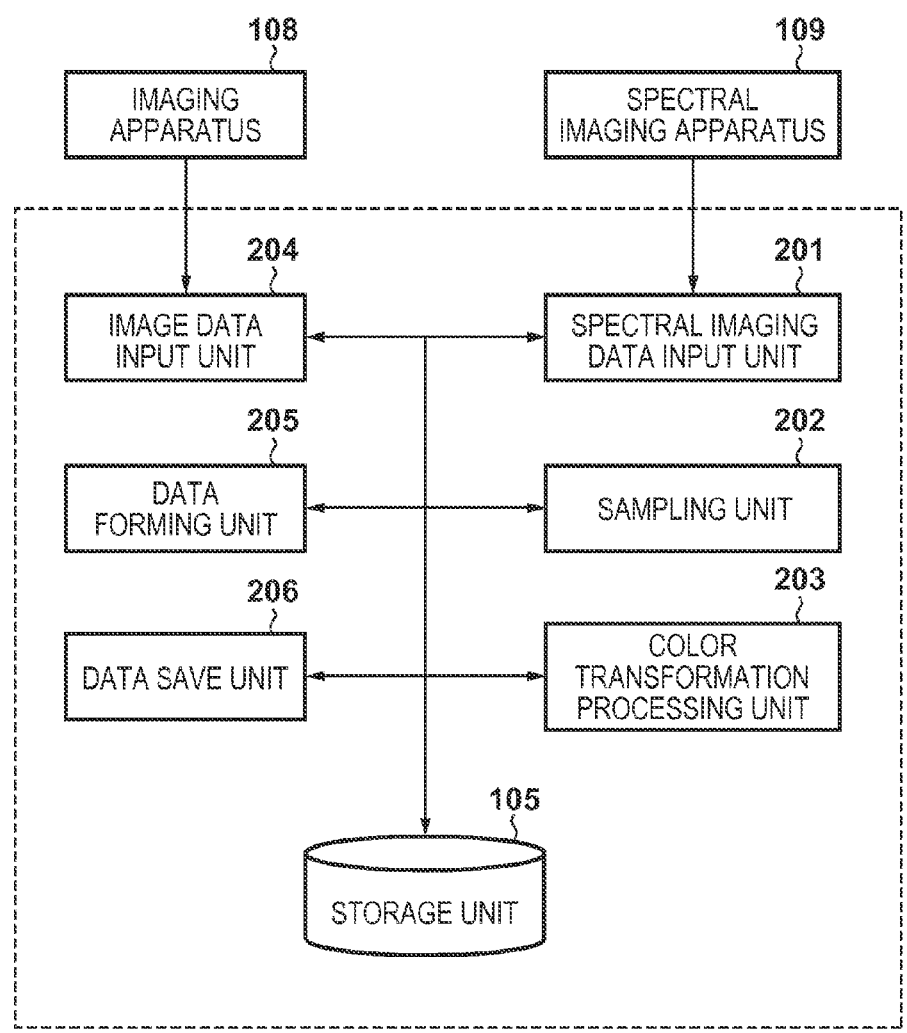
FIG. 3 is a block diagram showing the processing arrangement of an image processing apparatus according to the first embodiment.

FIG. 3 is a block diagram showing the processing arrangement of the image processing apparatus 100 according to the first embodiment. The processing arrangement shown in FIG. 3 is implemented when the CPU 101 executes the image processing program of the first embodiment.

In shooting processing, the image processing apparatus 100 receives image data and spectral imaging data by shooting a scene, performs data compression of the spectral imaging data, and generates data (to be referred to as "image data with spectral information" hereinafter) by combining the image data with the compressed spectral imaging data. That is, the image processing apparatus 100 generates image data by appending information relating to a light source to an image of the scene.

Based on a user instruction, an image data input unit 204 receives image data from the imaging apparatus 108 and a spectral imaging data input unit 201 receives spectral imaging data from the spectral imaging apparatus 109. The spectral imaging data input unit 201 transmits a trigger signal to the spectral imaging apparatus 109 in synchronism with, for example, a synchronization signal received by the image data input unit 204 from the imaging apparatus 108 to control the timing when the spectral imaging apparatus 109 acquires the spectral imaging data.

Figure 4:
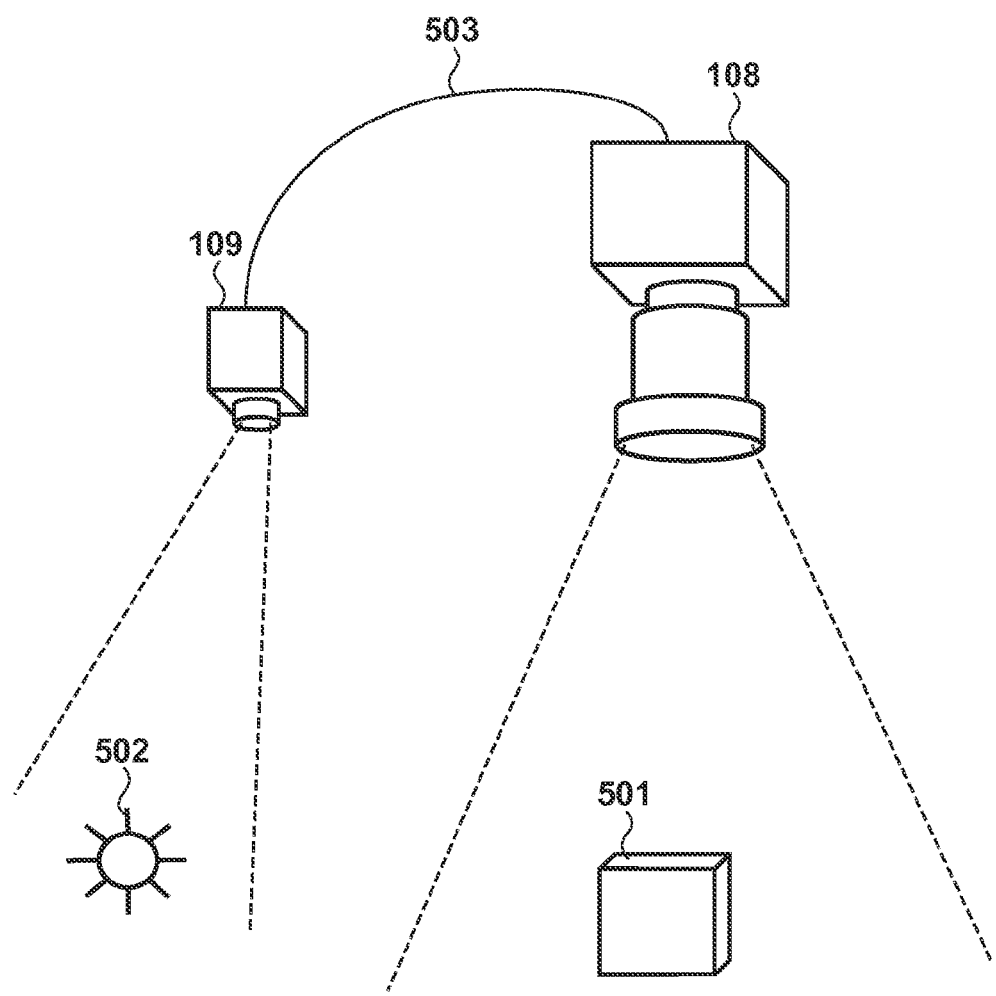
FIG. 4 is a view showing the relationship between an imaging apparatus and a spectral imaging apparatus.

FIG. 4 shows the relationship between the imaging apparatus 108 and the spectral imaging apparatus 109. The imaging apparatus 108 shoots an image of a scene including a subject 501. The spectral imaging apparatus 109 disposed near the imaging apparatus 108 performs spectral shooting of a light source 502 in the shooting scene and ambient light, thereby acquiring luminance information (spectral imaging data) for each light wavelength.

Note that the spectral imaging apparatus 109 is connected to the imaging apparatus 108 through USB or a wired or wireless network 503. While the imaging apparatus 108 shoots a scene, the spectral imaging apparatus 109 acquires the spectral imaging data of the light source 502 and ambient light per unit time. Note that in this embodiment, one spectral imaging data is acquired for each frame of imaging data. That is, when image data with 24 frames/sec (fps) is shot, 24 spectral imaging data are acquired per sec. The present invention, however, is not limited to this. The imaging apparatus 108 and the spectral imaging apparatus 109 may be integrated, as a matter of course. Alternatively, the imaging apparatus 108 and the spectral imaging apparatus 109 may be incorporated as an imaging unit and a spectral imaging unit in the image processing apparatus 100, respectively.

A sampling unit 202 samples and normalizes the spectral imaging data in a format recordable in, for example, the frame header of the image data. A data forming unit 205 generates image data with spectral information by recording data (to be referred to as "sampling spectral data" hereinafter) output from the sampling unit 202 in the header of a corresponding frame of the image data. A data save unit 206 stores the image data with spectral information in the RAM 102, the storage unit 105, or the like in accordance with a user instruction. The shooting processing has been explained above.

In color transformation processing, based on a user instruction, a color transformation processing unit 203 reads out the image data with spectral information from the RAM 102, the storage unit 105, or the like, and generates transformed image data by performing color transformation processing for the image data with spectral information. The transformed image data is temporarily stored in the RAM 102 or the storage unit 105, and saved in the storage unit 105 or output to the output device 111 in accordance with a user instruction.

Shooting Processing

Shooting processing will be described with reference to the flowchart of FIG. 5. Upon receiving a user instruction indicating the start of image processing (S301), the CPU 101 starts shooting processing.

The image data input unit 204 receives image data from the imaging apparatus 108, and outputs the image data to the data forming unit 205 (S302). The spectral imaging data input unit 201 receives spectral imaging data from the spectral imaging apparatus 109, and outputs the spectral imaging data to the sampling unit 202 (S303).

Next, the sampling unit 202 samples and normalizes the received spectral imaging data, and outputs sampling spectral data transformed in a format recordable in a frame header to the data forming unit 205 (S304), which will be described in detail later. The data forming unit 205 generates image data with spectral information by recording the sampling spectral data in the header of a corresponding frame of the received image data, and outputs the generated data with spectral information to the data save unit 206 (S305), which will be described in detail later.

The data save unit 206 stores the image data with spectral information in the RAM 102, the storage unit 105, or the like (S306).

The CPU 101 determines whether a user instruction indicating the end of the shooting processing has been input (S307). If no user instruction has been input, the process returns to step S302 to process subsequent image data. On the other hand, if a user instruction indicating the end of the shooting processing has been input, the process returns to step S301 to interrupt the shooting processing. Note that the processes in steps S302 to S306 may be performed for each frame, or for each set of a plurality of frames by providing frame buffers in the image data input unit 204 and the spectral imaging data input unit 201.

Sampling Unit

Sampling and normalization of spectral imaging data by the sampling unit 202 will be described with reference to FIGS. 6A and 6B. FIG. 6A shows a spectral radiance $L(\lambda)$ as the spectral imaging data of a given light source. Each point shown in FIG. 6B indicates sampling spectral data $L(i)$ corresponding to the spectral imaging data of FIG. 6A. The sampling unit 202 samples and normalizes the spectral imaging data at a predetermined wavelength interval using:

$$N=(\lambda_{max}-\lambda_{min})/S;$$

$$L(i)=\{L(\lambda_{min}+S\times i)-L_{min}\}\times D/L_{max}; \quad (1)$$

where $\lambda_{max}$ represents the maximum wavelength (for example, 780 nm) within the visible range, $\lambda_{min}$ represents the minimum wavelength (for example, 380 nm) within the visible range, S represents a sampling step (for example, 10 nm) of the radiance, $L_{min}$ represents a smallest value of $L(\lambda)$, $L_{max}$ represents a largest value of $L(\lambda)$, D represents a largest value (for example, 255) of the sampling spectral data, and i represents an integer ($0 \le i \le N$).

In the example of FIG. 6B, normalized 8-bit data $L(0)$ to $L(41)$ corresponding to 41 wavelengths are obtained as the sampling spectral data $L(i)$.

FIGS. 6A and 6B show an example in which the absolute value of the radiance is measured for each step of a wavelength of 1 nm, and data is sampled with S=10 nm. However, the measurement step may depend on the performance of the spectral imaging apparatus 109, and measurement with a step of 2 nm or 5 nm may be performed. Furthermore, if the measurement step exceeds 10 nm, the color transformation accuracy decreases but it is only necessary to generate the sampling spectral data $L(i)$ by setting the sampling step to S=20 nm or S=50 nm. Also, the radiance necessary for color transformation processing may be a relative value, and a relative value may be measured as a radiance.

Figure 7:
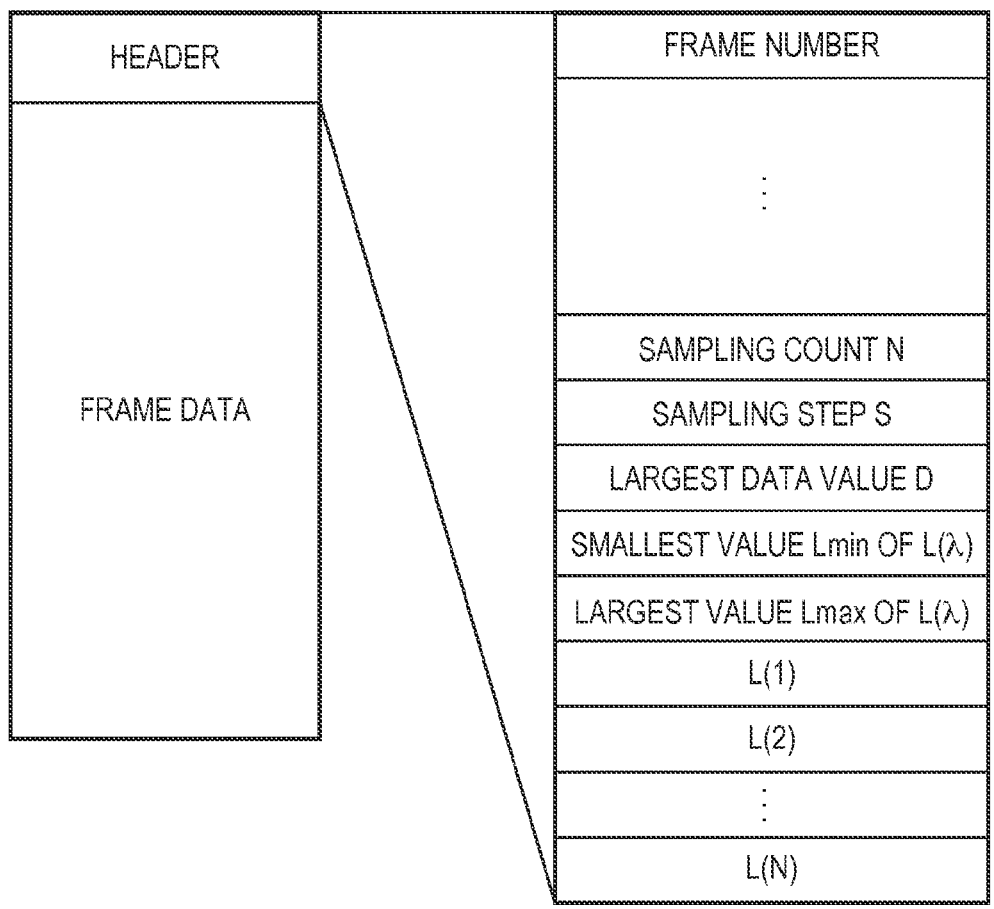
FIG. 7 is a view showing an example of the format of image data with spectral information.

FIG. 7 shows an example of the format of the image data with spectral information. FIG. 7 shows frame data, and a sampling count N and the sampling spectral data $L(i)$ are recorded in the header of the frame data. As described above, in shooting processing, image data including the spectral information of a light source in a shooting scene is generated.

Color Transformation Processing

Color transformation processing will be described with reference to the flowchart of FIG. 8.

Upon receiving a user instruction indicating the start of color transformation processing (S401), the CPU 101 starts the color transformation processing. Note that the user can instruct, through the UI, execution of shooting processing, continuous execution of shooting processing and color transformation processing, or execution of color transformation processing. If execution of shooting processing is instructed, the CPU 101 performs only the shooting processing. If execution of color transformation processing is instructed, the CPU 101 performs only the color transformation processing. Alternatively, if continuous execution of shooting processing and color transformation processing is instructed, the CPU 101 executes both the processes in parallel.

The color transformation processing unit 203 reads out data of a frame of interest from the image data with spectral information stored in the RAM 102 or the storage unit 105 (S402). The color transformation processing unit 203, which will be described in detail later, performs color transformation processing on the data of the frame of interest based on spectral information recorded in the header of the frame of interest, and outputs data on which the color transformation processing performed (to be referred to as "transformed frame data" hereinafter) to the data save unit 206 (S403).

The data save unit 206 saves the transformed frame data as transformed image data in the storage unit 105 or the like (S404). Upon completion of the color transformation processing of the frame of interest, the CPU 101 determines whether the color transformation processing has ended for all frames contained in the image data with spectral information (S405). If the color transformation processing has not ended, the process returns to step S402. This causes the color transformation processing unit 203 to read out the next frame as a frame of interest from the image data with spectral information, and execute the color transformation processing. The processes in steps S402 to S404 are repeated until the color transformation processing ends for all the frames contained in the image data with spectral information.

Note that the processes in steps S402 to S404 may be performed for each frame or for each set of a plurality of frames.

Color Transformation Processing Unit

Figure 9:
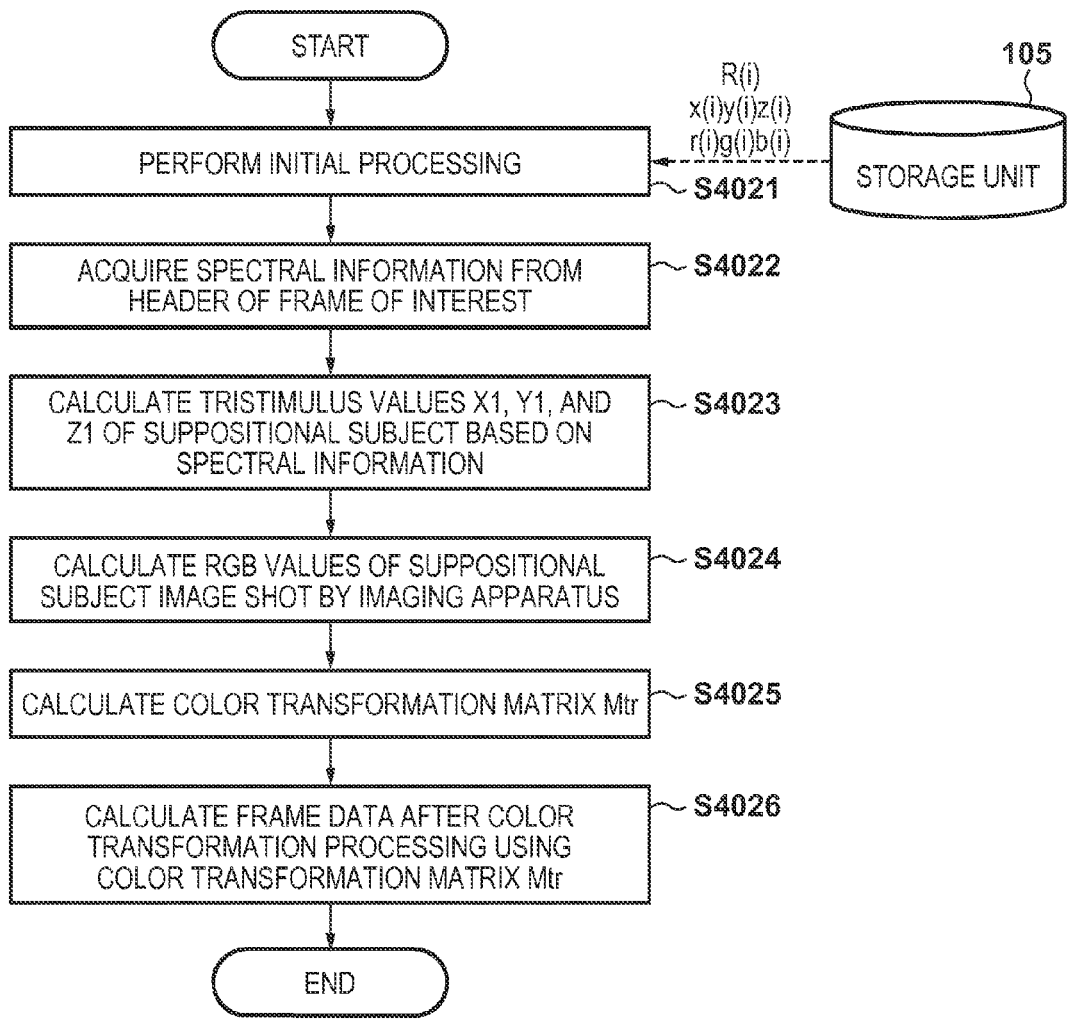
FIG. 9 is a flowchart for explaining processing by a color transformation processing unit.

The processing (S403) by the color transformation processing unit 203 will be described with reference to the flowchart of FIG. 9. Note that processing shown in FIG. 9 is processing for one frame.

The color transformation processing unit 203 calculates a color transformation matrix Mtr from the sampling spectral data L(i) recorded in the header of the frame of interest, and calculates frame data after color transformation by multiplication of the frame data and the color transformation matrix Mtr. Note that the color transformation matrix Mtr corresponds to input device transform (IDT), and is, for example, 3×3 matrix.

To calculate the color transformation matrix Mtr, the color transformation processing unit 203 acquires a spectral reflectance R(i) of a suppositional subject, color matching functions x(i), y(i), and z(i), and RGB filter characteristics r(i), g(i), and b(i) of the imaging apparatus 108 from the storage unit 105 (S4021). The spectral reflectance R(i) of the suppositional subject indicates sampling data sampled from a spectral reflectance R(λ) of the suppositional subject based on the sampling step S and sampling count N of the sampling spectral data L(i). Similarly, the color matching functions x(i), y(i), and z(i) indicate sampling data sampled from color matching functions x(λ), y(λ), and z(λ), and the transmission characteristics r(i), g(i), and b(i) indicate sampling data sampled from transmission characteristics r(λ), g(λ), and b(λ). Note that the processing in step S4021 is initial processing which needs to be executed only once in the color transformation processing.

The suppositional subject does not appear in the actual shooting scene, is a virtual subject necessary for calculation, and may be a color palette such as ColorChecker® or human skin.

Next, the color transformation processing unit 203 acquires spectral information from the header of the frame of interest (S4022), and calculates tristimulus values X1, Y1, and Z1 of the suppositional subject based on the spectral information (S4023) by:

$$L'(i)=L(i) \cdot L_{max}/D+L_{min};$$

$$X1=683(N-1)S \cdot \Sigma_1^N L'(i)R(i)x(i);$$

$$Y1=683(N-1)S \cdot \Sigma_1^N L'(i)R(i)y(i);$$

$$Z1=683(N-1)S \cdot \Sigma_1^N L'(i)R(i)z(i); \quad (2)$$

where i is an integer (1≤i≤N).

The color transformation processing unit 203 calculates RGB values $R_{Cam}$, $G_{Cam}$, and $B_{Cam}$ of a suppositional subject image shot by the imaging apparatus 108 (S4024) by:

$$R_{Cam}=(N-1)S \cdot \Sigma_1^N L'(i)R(i)r(i);$$

$$G_{Cam}=(N-1)S \cdot \Sigma_1^N L'(i)R(i)g(i);$$

$$B_{Cam}=(N-1)S \cdot \Sigma_1^N L'(i)R(i)b(i); \quad (3)$$

where i is an integer (1≤i≤N).

The color transformation processing unit 203 calculates the color transformation matrix Mtr which minimizes the differences between values X2, Y2, and Z2 calculated by equations (4) and (5) and the values X1, Y1, and Z1 calculated by equations (2) (S4025). Note that an optimization method is not limited. For example, a quasi-Newton method is used.

$$\begin{bmatrix} R_{ACES} \\ G_{ACES} \\ B_{ACES} \end{bmatrix} = Mtr \begin{bmatrix} R_{Cam} \\ G_{Cam} \\ B_{Cam} \end{bmatrix} \quad (4)$$

$$\begin{bmatrix} X2 \\ Y2 \\ Z2 \end{bmatrix} = \begin{bmatrix} 0.9525523959 & 0.0 & 0.0000936786 \\ 0.3439664498 & 0.7281660966 & -0.0721325464 \\ 0.0 & 0.0 & 1.0088251844 \end{bmatrix} \begin{bmatrix} R_{ACES} \\ G_{ACES} \\ B_{ACES} \end{bmatrix} \quad (5)$$

where $R_{ACES}$, $G_{ACES}$, and $B_{ACES}$ represent the RGB values in the ACES.

When a suppositional subject like a color palette is used, the processes in steps S4023 to S4025 are repeated for major colors (for example, memory colors) included in the color palette, thereby calculating the color transformation matrix Mtr which minimizes the total of color differences in the major colors.

When the color transformation matrix Mtr is calculated, the color transformation processing unit 203 calculates frame data after color transformation processing from the frame data using equation (4) (S4026). At this time, assume that the RGB values of the frame data are linear with respect to the luminance. If the frame data has undergone gamma correction, the color transformation processing unit 203 inversely transforms the frame data to be linear with respect to the luminance by inverse gamma correction, and then performs calculation of equation (4).

If there is no difference between the spectral information of the preceding frame and that of the frame of interest, or the difference between the pieces of spectral information is smaller than a predetermined threshold, the color transformation processing unit 203 uses the color transformation matrix Mtr calculated for the preceding frame.

The color transformation matrix Mtr calculated in processing of the past frame may be cached. In this case, when the spectral information of the frame of interest is equal or close to the spectral information of the cached color transformation matrix Mtr (cache hit), the color transformation processing unit 203 uses the cached color transformation matrix Mtr.

As described above, spectral information of a light source in a shooting scene is appended as color transformation information of image data to the image data, and a color transformation matrix is generated from the spectral information in color transformation processing. As a result, accurate color transformation reflecting the characteristics of the light source in the actual shooting scene becomes possible. Even if a shooting scene is illuminated by a light source other than a light source corresponding to a color transformation matrix prepared in advance, accurate color transformation reflecting the characteristics of the light source becomes possible.

Second Embodiment

Color processing of image data according to the second embodiment of the present invention will be described below. Note that the same reference numerals as those in the first embodiment denote the same components in the second embodiment and a detailed description thereof will be omitted.

In the first embodiment, the method of recording light source information in a frame header for each frame has been explained. In the second embodiment, a case in which a change in light source is recorded in a frame header will be described.

Figure 10:
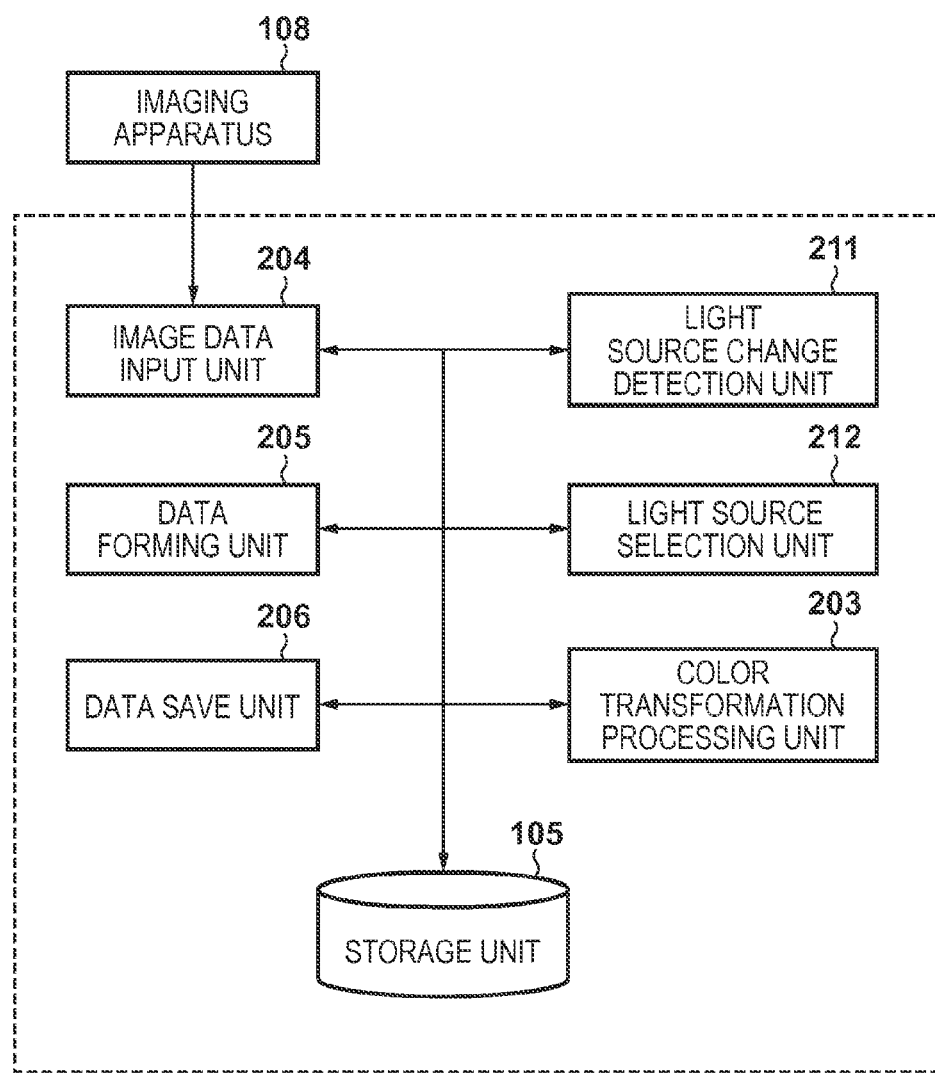
FIG. 10 is a block diagram showing the processing arrangement of an image processing apparatus according to the second embodiment.

FIG. 10 is a block diagram showing the processing arrangement of an image processing apparatus 100 according to the second embodiment. The processing arrangement shown in FIG. 10 is implemented when a CPU 101 executes an image processing program according to the second embodiment. The processing arrangement of the second embodiment is obtained by deleting the spectral imaging data input unit 201 and the sampling unit 202 from the arrangement shown in FIG. 3, and adding a light source change detection unit 211 and a light source selection unit 212. In the second embodiment, the spectral imaging apparatus 109 is not necessary.

The light source change detection unit 211 detects a change in light source from image data received by an image data input unit 204. For example, the light source change detection unit 211 need only detect a change in white balance of a frame as a change in light source.

Figure 11:
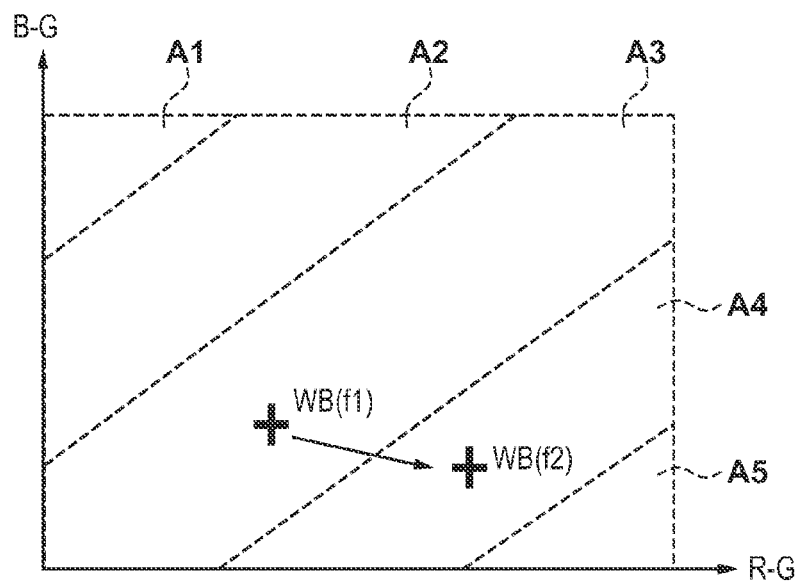
FIG. 11 is a view for explaining the relationship between white balance and a light source.

The relationship between the white balance and the light source will be described with reference to FIG. 11. White balance WB(f) in a given frame f is represented by the average values of B-G values and R-G values calculated for the respective pixels of the frame. Referring to FIG. 11, the intersection of straight lines extending from the average R-G value and the average B-G value indicates the white balance WB(f). Regions A1 to A5 shown in FIG. 11 express different light sources.

As shown in FIG. 11, if white balance WB(f1) of a frame f1 falls within the region A3 and white balance WB(f2) of a next frame f2 falls within the region A4, the light source change detection unit 211 determines that a light source in a shooting scene has changed. In this case, the light source change detection unit 211 outputs a light source change flag F="1" to a data forming unit 205.

The data forming unit 205 generates image data with a flag by recording the flag F output from the light source change detection unit 211 in the header of the frame for which the change in light source of the image data has been detected. A data save unit 206 stores the image data with the flag in a RAM 102, a storage unit 105, or the like in accordance with a user instruction. The above processing corresponds to shooting processing.

In color transformation processing, the light source selection unit 212 provides a light source selection dialog serving as a UI for selecting a light source in a shooting scene to the user, thereby prompting the user to select a light source. In the light source selection dialog, for example, a selection list of representative light source names is displayed. The user selects a light source name corresponding to a shooting scene displayed on an output device 111 from the list with reference to, for example, an image of the shooting scene.

Based on a user instruction, the color transformation processing unit 203 reads out the image data with the flag from the RAM 102, the storage unit 105, or the like, and generates transformed image data by performing color transformation processing for the image data with the flag using a color transformation matrix Mtr corresponding to the selected light source. The transformed image data is temporarily stored in the RAM 102 or the storage unit 105, and then saved in the storage unit 105 or output to the output device 111 in accordance with a user instruction.

Figure 12A:
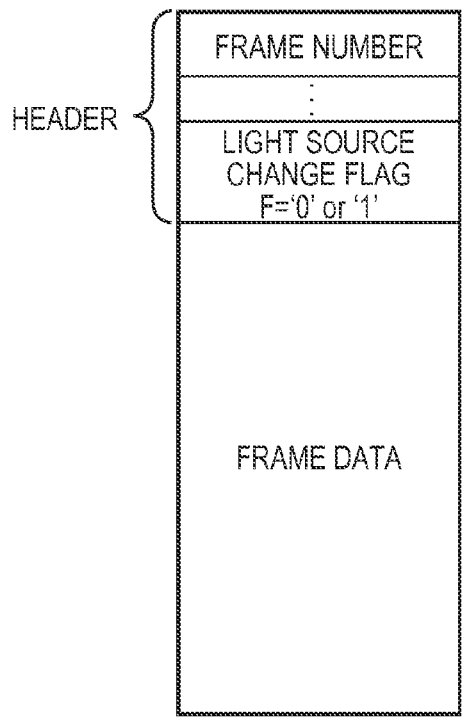
FIGS. 12A and 12B are views each showing an example of the format of image data with a flag.
Figure 12B:
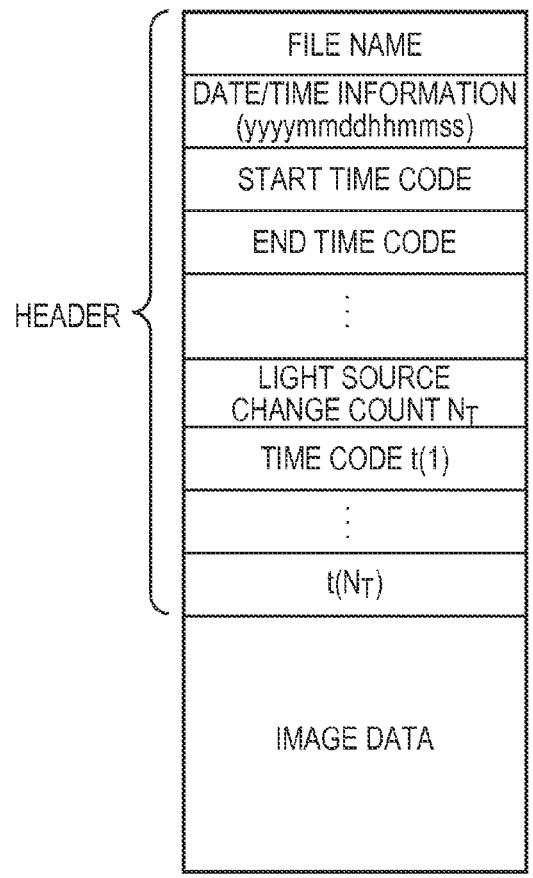

FIGS. 12A and 12B each show an example of the format of the image data with the flag. FIG. 12A shows frame data, and the light source change flag F is recorded in the header of the frame data. Note that F="1" is recorded in a frame for which a change in light source has been detected, and F="0" is recorded in a frame for which no change in light source has been detected.

Although image data with a frame set has been described above, image data may be stored in a multimedia container. In this case, as exemplified in FIG. 12B, the number $N_T$ of times of occurrence of the light source change flag F="1" and a time code t(j) ($1 \le j \le N_T$) of a frame for which a change in light source has been detected are recorded in the header of the container.

Shooting processing will be described with reference to the flowchart of FIG. 13. Note that processes in steps S301, S5302, and S5307 are the same as in the first embodiment and a detailed description thereof will be omitted.

The light source change detection unit 211 detects a change in light source from image data (S311), and the data forming unit 205 generates image data with a flag (S312). The data save unit 206 stores the image data with the flag in the RAM 102, the storage unit 105, or the like (S313).

Color transformation processing will be described with reference to the flowchart of FIG. 14. Note that processes in steps S401 and S403 to S405 are the same as in the first embodiment and a detailed description thereof will be omitted.

When color transformation processing starts, the light source selection unit 212 displays the light source selection dialog on the UI (S411), and stands by for selection of a light source (S412). When a light source is selected, the light source selection unit 212 advances the process to step S413.

A color transformation processing unit 203 reads out a frame of interest from the image data with the flag stored in the RAM 102 or the storage unit 105 (S413), and determines the light source change flag F of the frame of interest (S414). If F="0", the color transformation processing unit 203 advances the process to step S403. On the other hand, if F="1", a change in light source has been detected, and thus the color transformation processing unit 203 causes the light source selection unit 212 to display the light source selection dialog on the UI (S415), and stands by for selection of a light source (S416). When a light source is selected, the color transformation processing unit 203 advances the process to step S403.

In step S403, the color transformation processing unit 203 reads out a color transformation matrix Mtr corresponding to the selected light source from the storage unit 105, and sets the color transformation matrix Mtr in color transformation processing, thereby performing the color transformation processing. That is, unless a frame for which a change in light source has been detected appears, the color transformation processing using the set color transformation matrix Mtr is continued. When a frame for which a change in light source has been detected appears, the color transformation matrix Mtr is reselected and reset, and color transformation processing using the reset color transformation matrix Mtr starts.

As described above, information indicating a change in light source in a shooting scene is appended to image data, and a color transformation matrix is reset based on the information indicating the change in light source in color transformation processing. As a result, accurate color transformation reflecting the characteristics of the light source in the actual shooting scene becomes possible.

Note that a case in which the light source change detection unit 211 is used to detect a change in light source has been explained above. However, the user can instruct a change in light source through an input device 107, acquire the time code of the timing when the instruction is input, and set the time code as a light source change timing.

Third Embodiment

Color processing of image data according to the third embodiment of the present invention will be described below. Note that the same reference numerals as in the first and second embodiments denote the same components in the third embodiment and a detailed description thereof will be omitted.

In the first embodiment, the example in which spectral information is appended to frame data has been explained. Although the spectral information has been sampled and normalized, 41 sampling spectral data L(i) are appended to the header in the case of the sampling step S=10 nm, thereby increasing the data amount of image data.

In the third embodiment, a color transformation matrix Mtr is created from spectral imaging data, and appended to frame data. When the color transformation matrix Mtr is a 3×3 matrix, only nine matrix coefficients are appended to frame data, thereby reducing the data amount to be appended. That is, it is possible to suppress an increase in data amount of image data without lowering the transformation accuracy by decreasing a sampling count N.

Figure 15:
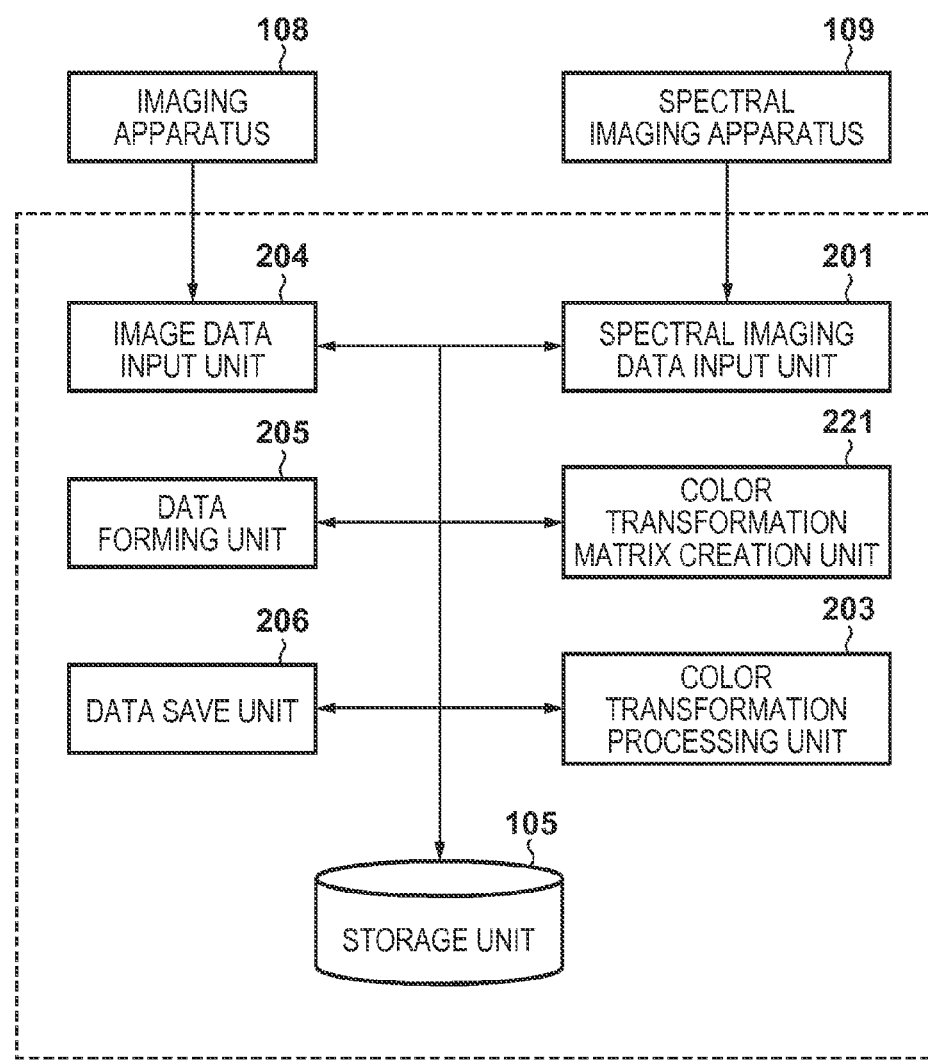
FIG. 15 is a block diagram showing the processing arrangement of an image processing apparatus according to the third embodiment.

FIG. 15 is a block diagram showing the processing arrangement of an image processing apparatus 100 according to the third embodiment. The processing arrangement shown in FIG. 15 is implemented when a CPU 101 executes an image processing program according to the third embodiment. The processing arrangement of the third embodiment includes a color transformation matrix creation unit 221 in place of the sampling unit 202.

The color transformation matrix creation unit 221 creates a color transformation matrix Mtr from received spectral imaging data. A method of creating the color transformation matrix Mtr is the same as in the first embodiment except that each data is not sampled and spectral information is not normalized. That is, the color transformation matrix creation unit 221 calculates tristimulus values X1, Y1, and Z1 of a suppositional subject and the RGB values of a suppositional subject image shot by an imaging apparatus 108 using, in place of equations (2) and (3), $X1 = 683 \int_{380}^{780} L(\lambda) R(\lambda) x(\lambda);$ $Y1 = 683 \int_{380}^{780} L(\lambda) R(\lambda) y(\lambda);$ $Z1 = 683 \int_{380}^{780} L(\lambda) R(\lambda) z(\lambda);$ (2')

where the integration range is merely an example.

$R_{Cam} = \int_{380}^{780} L(\lambda) R(\lambda) r(\lambda);$ $G_{Cam} = \int_{380}^{780} L(\lambda) R(\lambda) g(\lambda);$ $B_{Cam} = \int_{380}^{780} L(\lambda) R(\lambda) b(\lambda);$ (3')

wherein the integration range is merely an example.

The color transformation matrix Mtr is then created using equations (4) and (5).

A data forming unit 205 generates image data with a color transformation matrix by recording the matrix coefficients of the color transformation matrix output from the color transformation matrix creation unit 221 in the header of a frame. A data save unit 206 stores the image data with the color transformation matrix in a RAM 102, a storage unit 105, or the like in accordance with a user instruction. The above processing corresponds to shooting processing.

Figure 16:
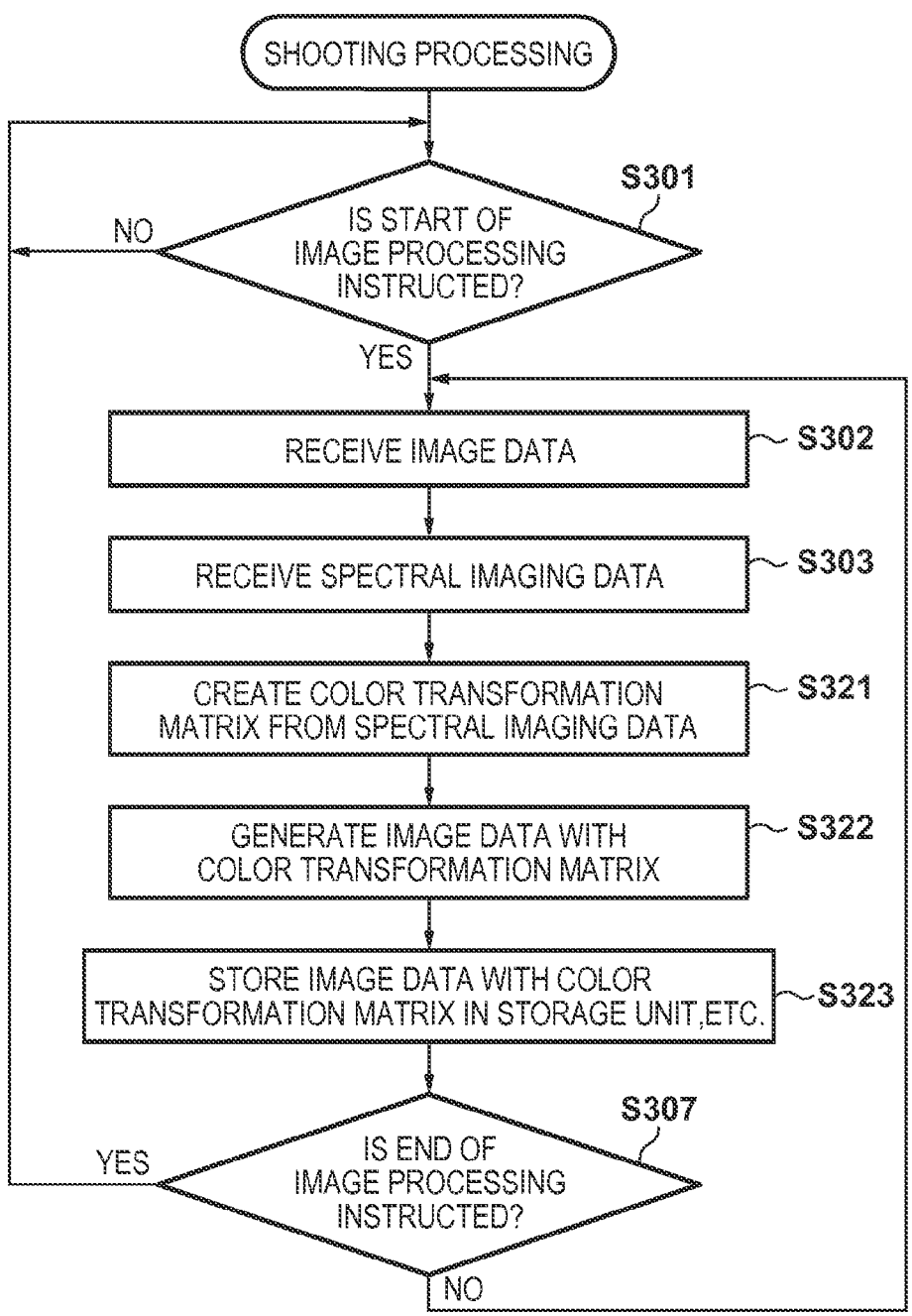
FIG. 16 is a flowchart for explaining shooting processing.

The shooting processing will be described with reference to the flowchart of FIG. 16. Note that processes in steps S5301, S5302, S5303, and S5307 are the same as in the first embodiment and a detailed description thereof will be omitted.

The color transformation matrix creation unit 221 creates a color transformation matrix from spectral imaging data (S321). The data forming unit 205 generates image data with the color transformation matrix (S322). Then, the data save unit 206 stores the image data with the color transformation matrix in the RAM 102, the storage unit 105, or the like (S323).

Figure 8:
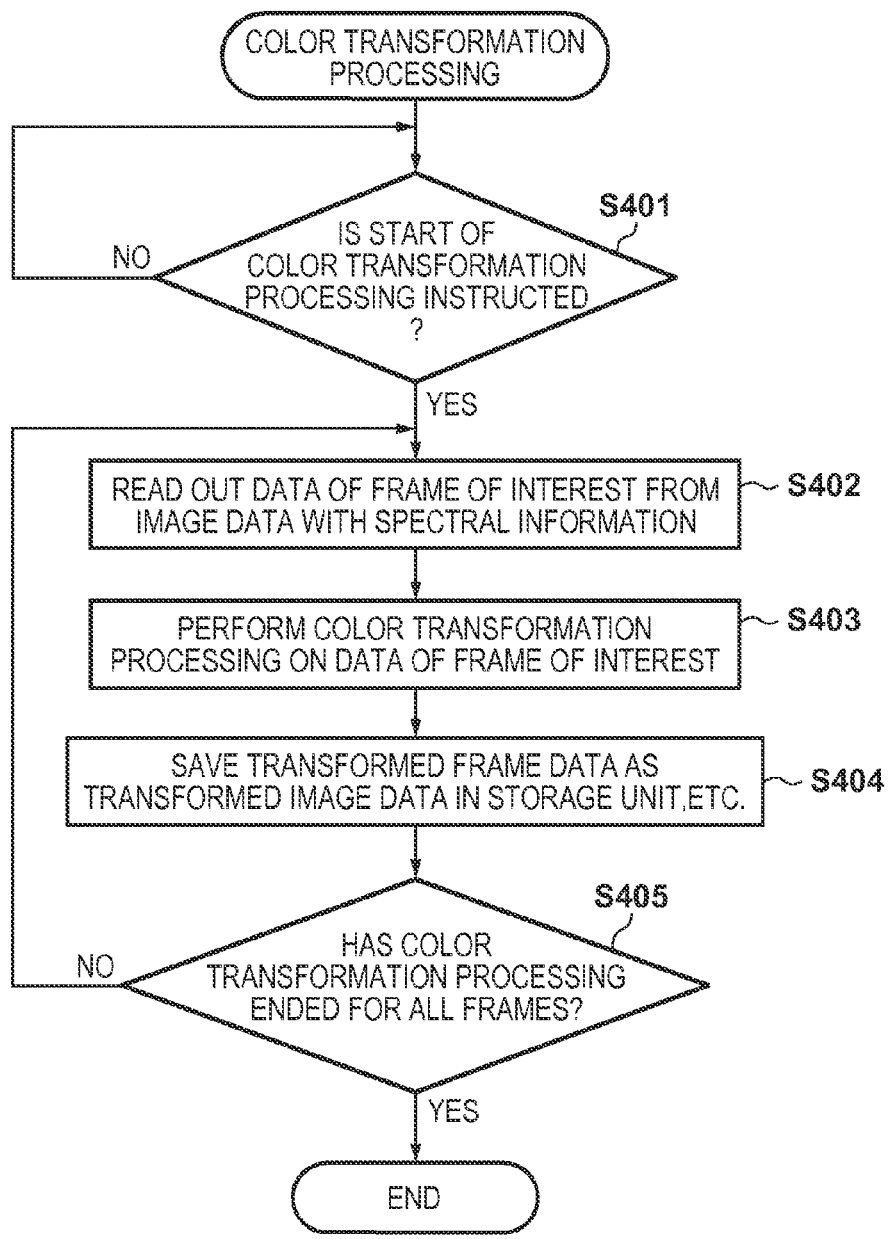
FIG. 8 is a flowchart for explaining color transformation processing.

In color transformation processing according to the third embodiment, "the image data with spectral information" of the processing in step S402 of "reading out a frame of interest from the image data with spectral information" in FIG. 8 is replaced by "the image data with the color transformation matrix". A color transformation processing unit 203 calculates frame data after color transformation processing from the frame data by equation (4) using the color transformation matrix Mtr appended to the frame of interest (S4026). There is no big difference in processing except for the above points.

If there is no difference between the spectral imaging data of the preceding frame and that of the frame of interest, or the difference between the spectral imaging data is smaller than a predetermined threshold, the color transformation matrix creation unit 221 outputs the color transformation matrix Mtr created for the preceding frame.

The color transformation matrix Mtr created in processing of the past frame may be cached. In this case, when the spectral imaging data of the frame of interest is equal or close to the spectral imaging data of the cached color transformation matrix Mtr (cache hit), the color transformation matrix creation unit 221 outputs the cached color transformation matrix Mtr.

As described above, a color transformation matrix corresponding to a light source in a shooting scene is appended as color transformation information of image data to the image data, and color transformation processing is executed using the color transformation matrix. As a result, accurate color transformation reflecting the characteristics of the light source in the actual shooting scene is possible. Even if a shooting scene is illuminated by a light source other than a light source corresponding to a color transformation matrix prepared in advance as in the first embodiment, it is possible to perform accurate color transformation reflecting the characteristics of the light source.

Modification of Embodiments

Although the three embodiments have been described above, the functions of the embodiments can be combined. For example, by combining the first and second embodiments, if a change in light source in a shooting scene is detected, it is possible to append spectral information to a frame for which the change in light source has been detected. Alternatively, by combining the second and third embodiments, if a change in light source in a shooting scene is detected, it is possible to generate a color transformation matrix from the spectral characteristics of the light source, and append the color transformation matrix to a frame for which the change in light source has been detected.

A change in light source may be detected by determining a change in white balance of a frame of image data, or a change in spectral imaging data. In this way, if spectral information or a color transformation matrix is appended when a change in light source is detected, it is possible to reduce the calculation amount of the CPU 101.

According to the above embodiments, for example, when a light source in a shooting scene changes, it is possible to prevent color deviation caused by a mismatch between a light source assumed by color transformation of image data and the light source in the actual shooting scene by color transformation based on information relating to the light source.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-045561 filed Mar. 7, 2014 which is hereby incorporated by reference herein in its entirety.

What is claimed is:

1. An image processing apparatus comprising:
    a first input unit configured to input image data;
    a second input unit configured to input spectral imaging data of shooting scene of the image data;
    a generation unit configured to generate information relating to a light source of the shooting scene based on the spectral imaging data; and
    an appending unit configured to append the information relating to the light source to the image data,
    wherein at least one of the first input unit, the second input unit, the generation unit, or the appending unit is implemented using a processor.

2. The apparatus according to claim 1, wherein the generation unit generates spectral information by sampling the spectral imaging data at a predetermined wavelength interval, as the information relating to the light source.

3. The apparatus according to claim 1, wherein the generation unit generates spectral information by sampling the spectral imaging data at a predetermined wavelength interval and normalizing the sampled spectral imaging data, as the information relating to the light source.

4. The apparatus according to claim 2, further comprising a transformation unit configured to generate a color transformation matrix based on the spectral information appended to the image data, and perform color transformation on the image data using the color transformation matrix.

5. The apparatus according to claim 4, wherein the transformation unit generates the color transformation matrix using the spectral information, spectral reflectance of a suppositional subject, color matching functions, and RGB filter characteristics of an imaging device which shoots the image data.

6. The apparatus according to claim 1, wherein the generation unit generates a color transformation matrix for the image data, as the information relating to the light source.

7. The apparatus according to claim 6, wherein the generation unit generates the color transformation matrix using the spectral imaging data, spectral reflectance of a suppositional subject, color matching functions, and RGB filter characteristics of an imaging device which shoots the image data.

8. The apparatus according to claim 6, further comprising a transformation unit configured to perform color transformation on the image data using the color transformation matrix appended to the image data.

9. The apparatus according to claim 1, further comprising a detection unit configured to detect light-source change in the shooting scene,
    wherein, in a case where the light-source change is detected, the generation unit generates the information relating to the light source based on the spectral imaging data corresponding to a frame in which the light-source change is detected, and the appending unit appends the generated information relating to the light source to image data of the frame in which the light-source change is detected.

10. The apparatus according to claim 9, wherein the detection unit detects the light-source change based on change of a white balance of the image data.

11. The apparatus according to claim 1, further comprising:
an imaging unit configured to generate the image data; and
a spectral imaging unit configured to generate the spectral imaging data of the shooting scene of the image data,
wherein the spectral imaging unit is disposed near the imaging unit.

12. An image processing apparatus comprising:
an input unit configured to input image data;
a detection unit configured to detect light-source change in shooting scene from the image data; and
an appending unit configured to append information indicating the light-source change to the image data,
wherein at least one of the input unit, the detection unit, or the appending unit is implemented using a processor.

13. The apparatus according to claim 12, wherein the detection unit detects the light-source change based on change of a white balance of the image data, and the appending unit appends the information indicating the light-source change to image data of a frame in which the light-source change is detected.

14. The apparatus according to claim 12, further comprising a selection unit configured to provide a user interface for selecting a light source; and
a transformation unit configured to perform color transformation on the image data using a color transformation matrix corresponding to a light source selected using the user interface,
wherein, in a case where the information indicating the light-source change appended to the image data is detected, the selection unit provides the user interface.

15. An image processing method comprising:
using a processor to perform steps of:
inputting image data;
inputting spectral imaging data of shooting scene of the image data;
generating information relating to a light source of the shooting scene based on the spectral imaging data; and
appending the information relating to the light source to the image data.

16. A non-transitory computer readable medium storing a computer-executable program for causing a computer to perform an image processing method, the method comprising:
inputting image data;
inputting spectral imaging data of shooting scene of the image data;
generating information relating to a light source of the shooting scene based on the spectral imaging data; and
appending the information relating to the light source to the image data.

17. An image processing method comprising:
using a processor to perform steps of:
inputting image data;
detecting light-source change in shooting scene for the image data by using spectral imaging data; and
appending information indicating the light-source change to the image data.

18. A non-transitory computer readable medium storing a computer-executable program for causing a computer to perform an image processing method, the method comprising:
inputting image data;
detecting light-source change in shooting scene for the image data by using spectral imaging data; and
appending information indicating the light-source change to the image data.

* * * * *